United States Patent [19]

Tabourier

[11] Patent Number: 4,907,000
[45] Date of Patent: Mar. 6, 1990

[54] TRANSMISSION RECEPTION SYSTEM FOR FREQUENCY-AGILE DOPPLER RADARS

[75] Inventor: Remy Tabourier, Paris, France
[73] Assignee: Thomson-CSF, Paris, France
[21] Appl. No.: 186,613
[22] Filed: Aug. 29, 1980
[30] Foreign Application Priority Data
Sep. 7, 1979 [FR] France .................... 79 22453
[51] Int. Cl.⁴ .............................. G01S 13/24
[52] U.S. Cl. ...................... 342/84; 342/131
[58] Field of Search ............. 343/7.5, 17.2 R; 342/83, 84, 131, 201

[56] References Cited

U.S. PATENT DOCUMENTS
4,071,844 1/1978 Hopwood et al. .............. 342/201 X

FOREIGN PATENT DOCUMENTS
1014810 12/1965 United Kingdom .

Primary Examiner—T. H. Tubbesing
Attorney, Agent, or Firm—Herbert Dubno

[57] ABSTRACT

A transceiver system of a frequency-agile Doppler radar comprises a transmission-side and a reception-side oscillator circuit both connected to a frequency-agility controller for concurrently varying their operating frequencies. Each of these oscillator circuits includes a high-frequency generator coupled via a frequency divider and a frequency multiplier to a pair of auxiliary mixers in a control loop of an associated microwave generator, the loop further including another frequency divider between the two mixers. The step-down ratios of the two frequency dividers of each oscillator circuit is adjustable by the frequency-agility controller. The microwave generator of the transmission-side oscillator circuit emits an outgoing signal to a duplexer connected to the radar antenna while incoming echoes are fed by the duplexer to a first principal mixer receiving a heterodyning signal from the microwave generator of the reception-side oscillator circuit. The reception-side high-frequency generator has a fixed operating frequency while its transmission-side counterpart is voltage-controlled by a phase loop including a second and a third principal mixer in cascade with each other. The second principal mixer receives the output signals of the two frequency multipliers while the third principal mixer introduces a frequency-transposition signal from a Doppler oscillator into that phase loop; the Doppler oscillator is controlled by a frequency discriminator receiving the output signal of the first principal mixer through a narrow-band filter.

7 Claims, 2 Drawing Sheets 4,907,000

TRANSMISSION RECEPTION SYSTEM FOR FREQUENCY-AGILE DOPPLER RADARS

FIELD OF THE INVENTION

My present invention relates to frequency-agile Doppler radars and, more particularly, to a transmission/reception or transceiver system for such radars.

BACKGROUND OF THE INVENTION

In Doppler radars, the shift between the transmitted and received frequencies due to the Doppler effect is given by the relationship $f_d = 2V_r/\lambda$ in which $V_r$ is the relative radial velocity of a target with respect to the radar and $\lambda$ is the wavelength of the transmitted signal.

Usually, the transmitted signal is at a fixed frequency throughout its processing, i.e. during a time interval depending on the resolving power required.

In frequency-agile radars, however, the frequency of the transmitted signal can be varied form one filter cycle to the next in order to foil possible jammers.

The Doppler shift depends on the wavelength of the transmitted signal; if the change in transmitted wavelength is excessive, the corresponding variation in the Doppler shift becomes greater than the bandwidth of an intermediate-frequency filter provided on the reception side of the system. Such a shift in the frequency of the received signal relative to the center of the pass band of this reception-side filter causes a loss of data pertaining to the speed and tracking of the target.

Conventional Doppler tracking radars usually have two oscillators. Thus, a transmission-side oscillator 12 shown in FIG. 1 may be crystal-controlled to supply the purest reference wave possible. A reception-side oscillator 2, feeding a heterodyning signal to first and second mixers A and B, is of the voltage-controlled type responsive to an automatic-frequency-control (AFC) circuit 4 so that the signal received from the target and stepped down to an intermediate-frequency level has a fixed frequency. Circuit 4 is, in turn, controlled by a frequency discriminator 3. A phase loop 6 enables the reception-side oscillator 2 to have the spectral purity of the transmission-side oscillator 1, target tracking being facilitated by introducing into this loop a variable transposition frequency fed to a third mixer C from a so-called Dopper oscillator 5 at a lower frequency which is easier to produce with good spectral purity. Mixer A receives incoming echo signals from an antenna 91 via a duplexer 9 to which outgoing signals are supplied by way of a modulator 8 from oscillator 1; the latter also feeds the mixer B whose output is connected to phase loop 6.

However, during frequency-agile operation such systems do not enable the avoidance of a momentary shift in the mid-frequency of the incoming signal with respect to the center frequency of a narrow-band intermediate-frequency filter 7, which passes the output signal S of mixer A to discriminator 3, since the automatic-frequency-control loop is not fast enough for an instantaneous correction of the shift.

OBJECT OF THE INVENTION

The object of my present invention, therefore, is to provide means for obviating the above-mentioned disadvantage so as to provide a transmission/reception system able to operate with a wide variation in the transmitted frequency while keeping the signal received from the target at the center of the pass band of the reception-side i-f filter.

SUMMARY OF THE INVENTION

In accordance with a feature of my present invention, the transmission-side oscillator and the reception-side oscillator of the transceiver system are circuits with frequency-adjusting inputs connected to a frequency-agility controller; the transmission-side oscillator circuit also receives a video-frequency control signal from mixer means in a phase loop excluding the reception-side oscillator circuit, the mixer means including the cascaded second and third mixers (B, C) referred to above.

A transceiver system according to my present invention can be used in frequency-agile Doppler tracking radars carried on missile or fighter aircraft.

BRIEF DESCRIPTION OF THE DRAWING

The above and other features of my invention will now be described in detail with reference to the accompanying drawing in which.

SPECIFIC DESCRIPTION

Figure 1:
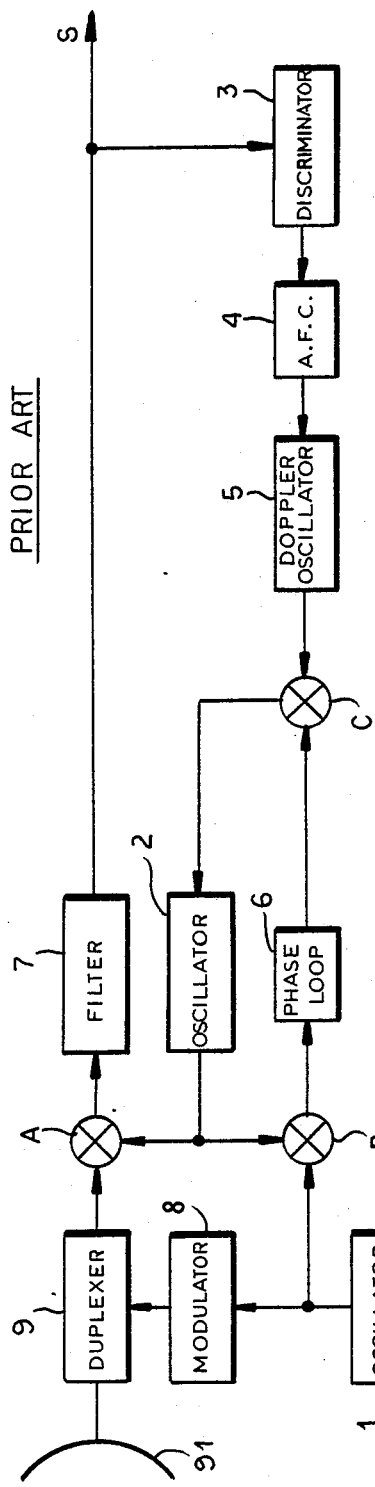
FIG. 1, already discussed, is a block diagram of a prior-art transmission/reception system for a Doppler radar.
Figure 2:
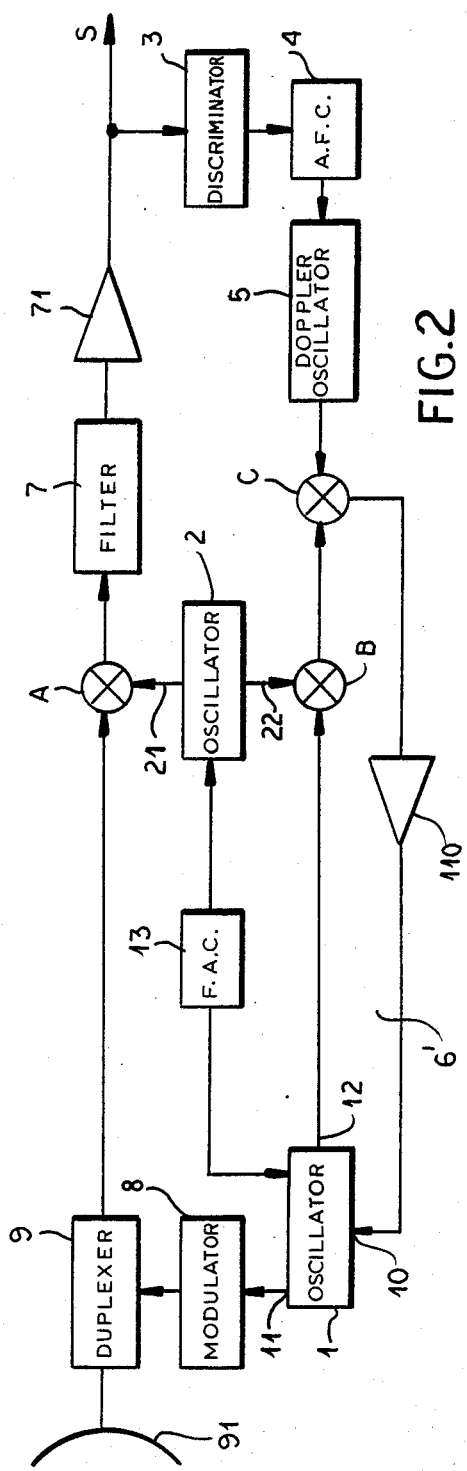
FIG. 2 is a block diagram of a transmission/reception system in accordance with my invention.

The transceiver system of FIG. 2 includes mixers A, B, C and other components described with reference to FIG. 1. In accordance with my present invention, however, the transmission-side oscillator 1—with an output 11 delivering an outgoing microwave signal to the antenna 91 through modulator 8 and duplexer 9—is also of the frequency-controlled type. The reception-side oscillator 2 delivers to the first mixer A, via an output 21, a signal for transposing the echo signals received from duplexer 9 to an intermediate-frequency level. The narrow-band filter 7, connected to the output of mixer A, works into an intermediate-frequency amplifier 71 that delivers the signals S to frequency discriminator 3 emitting a signal proportional to the deviation of the frequency of the signals S from the central frequency of narrow-band filter 7. The automatic-frequency-control loop including the circuit 4 causes oscillator 5 to emit an output signal representing the Doppler frequency of the echo signals. The cascaded second and third mixers B, C form part of a phase loop 6' generating a variable transposition frequency. Mixer B receives, from an output 12 of transmission-side oscillator 1 and an output 22 of reception-side oscillator 2, signals representing their respective frequency and phase references. The output of mixer B directly feeds one input of mixer C whereas the output of Doppler oscillator 5 feeds another input of mixer C. In accordance with the invention, the phase loop 6' further contains, at the output of mixer C, a video-frequency amplifier 110 connected to a control input 10 of transmission-side oscillator 1. The operation of my improved transceiver system shown in FIG. 2 is as follows:

The Doppler tracking, which is performed by the automatic-frequency-control loop with the aid of Doppler oscillator 5 controlled in turn by frequency discriminator 3, is carried out directly through third mixer C and video-frequency amplifier 110 connected to transmission-side oscillator 1. Thus, the frequency of the outgoing radar signal is directly lined with the relative speed of the target with respect to the radar as determined by the Doppler frequency generated by oscillator 5. The frequency of the echo signals received from the target is thereby held at the center of the pass band of i-f filter 7. A frequency-agility controller 13 emits a modulating signal enabling the simultaneous variation of the frequencies of the signals supplied by transmission-side oscillator 1 and reception-side oscillator 2, respectively, without shifting the midfrequency of the received i-f signals S to be passed by filter 7.

Figure 3:
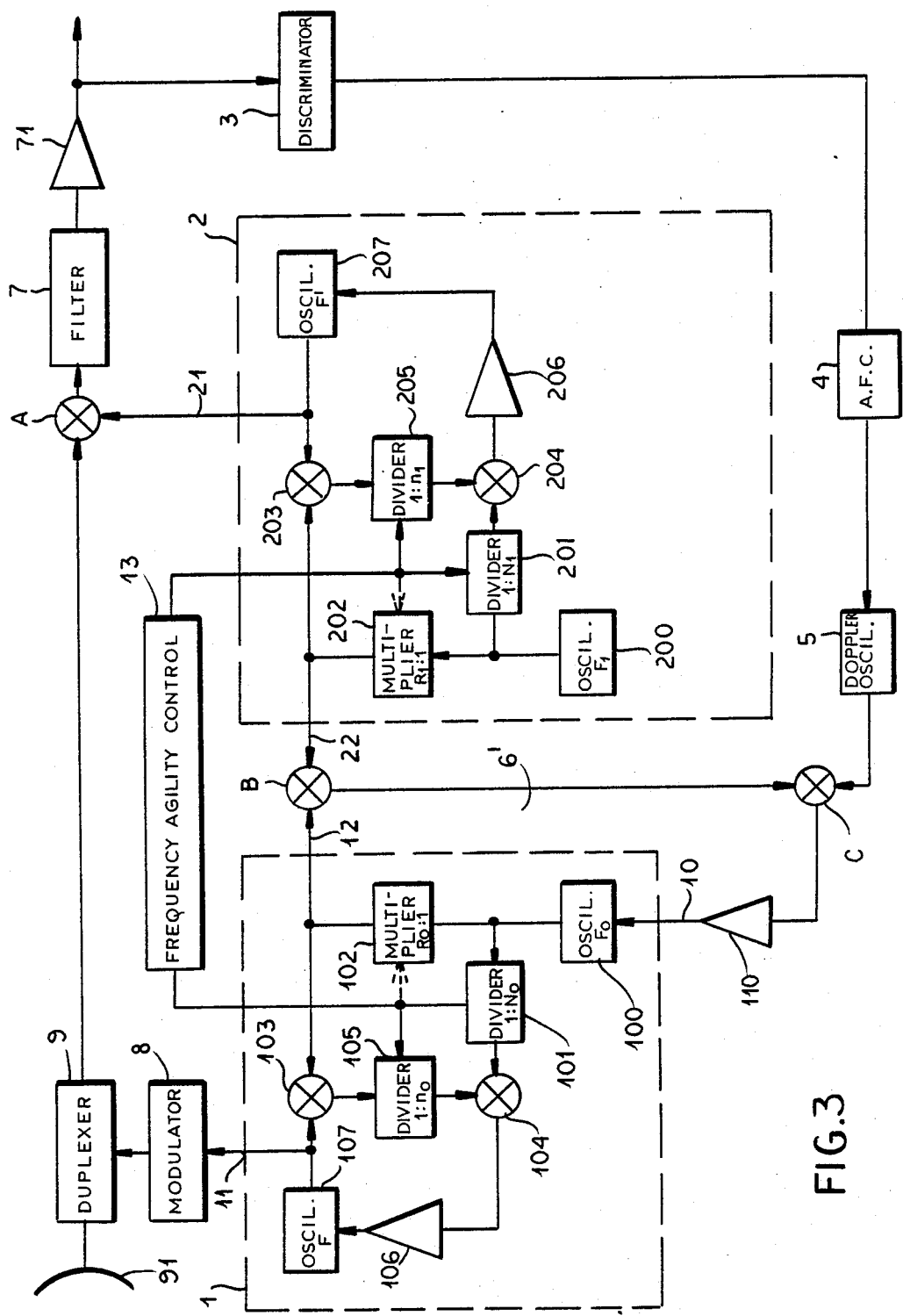
FIG. 3 shows a preferred circuit arrangement of an embodiment of my invention conforming to FIG. 2.

In accordance with the specific embodiment shown in FIG. 3, transmission-side oscillator 1 is a circuit comprising an auxiliary oscillation generator 100 which is voltage-controlled and delivers a high-frequency signal. This oscillator 1 also contains a first adjustable frequency divider 101 and frequency multiplier 102 which each receive the high-frequency signal emitted by the oscillation generator 100. Frequency divider 101 and frequency multiplier 102 operate with a step-down ratio of 1:$N_o$ and with a step-up ratio of $R_o$:1, respectively, on the high-frequency signal delivered by oscillation generator 100. Circuit 1 also contains first and second auxiliary mixers 103 and 104 with inputs connected to frequency multiplier 102 and frequency divider 101, respectively. A second adjustable frequency divider 105 with a step-down ratio of 1:$n_o$ connects the output of auxiliary mixer 103 to another input of auxiliary mixer 104. Transmission-side oscillator 1 also contains a voltage-controlled microwave generator 107 whose control input is connected to the output of auxiliary mixer 104 through an amplifier 106. Oscillation generator 107 delivers the outgoing microwave signal of frequency F to the modulator 8 and the duplexer 9 through the output 11 of oscillator circuit 1, on the one hand, and to another input of auxiliary mixer 103, on the other hand. The frequency and phase reference of transmission-side oscillator 1 delivered to mixer B is provided by frequency multiplier 102. Components A, B and C may be referred to as principal mixers, in contradistinction to the auxiliary mixers 103 and 104 of the internal control loop of oscillator circuit 1; and latter functions as follows:

High-frequency generator 100 supplies a signal of instantaneous frequency $F_o$ to the control loop 103-106 of microwave generator 107; multiplier 102 and frequency divider 101, coupled to that control loop by auxiliary mixers 103 and 104, have output frequencies of $R_o \cdot F_o$ and $F_o/N_o$, respectively. Mixer 103 produces a microwave signal of beat frequency $F - R_o F_o$ which is stepped down by divider 105 to an input frequency $\pm(F - R_o F_o)/n_o$ for mixer 104 also receiving the frequency $F_o/N_o$ from divider 101. A zero beat frequency in the output of mixer 104 yields an operating frequency $F = F_o(R_o \pm n_o/N_o)$ for microwave generator 107.

As further shown in FIG. 3, reception-side oscillator 2 contains a fixed-frequency master oscillation generator 200 which delivers a high-frequency signal. Circuit 2 also includes a first frequency divider 201 and a frequency multiplier 202. Frequency divider 201 and frequency multiplier 202 each receive the output signal of oscillation generator 200 whose frequency they respectively step down in a ratio of 1:$N_1$ and step up in a ratio of $R_1$:1. Circuit 2 further comprises first and second auxiliary mixers 203 and 204 with inputs connected to frequency multiplier 202 and frequency divider 201, respectively. A second frequency divider 205 connects the outputs of auxiliary mixer 203 to another input of auxiliary mixer 204. Frequency divider 205 has a step-down ratio of 1:$n_1$. Reception-side oscillator 2 also contains a voltage-controlled microwave generator 207 whose control input is connected to the output of auxiliary mixer 204 through an amplifier 206.

In operation, microwave generator 207 provided with control loop 203-206 emits an output signal of frequency F', which transposes the incoming echo signals, to principal mixer A and to another input of auxiliary mixer 203. The frequency and phase reference of circuit 2 is the signal delivered by frequency multiplier 202 to principal mixer B.

The operation of reception-side oscillator 2 is analogous to that of transmission-side oscillator 1. With a frequency $F_1$ for the output signal of pilot-wave generator 200, microwave generator 207 produces a heterodyning signal of frequency $F' = F_1(R_1 \pm n_1/N_1)$. The frequency agility of the radar is obtained by the control of the values of integral parameters $n_o$, $N_o$ and $n_1$, $N_1$. For this purpose the frequency-agility controller 13 already referred to enables the simultaneous adjustment of parameters $n_o$, $N_o$ and $n_1$, $N_1$; an adjustment of parameters $R_o$ and $R_1$ has been indicated in FIG. 3 by broken arrows since this control is not essential. The transceiver system shown in FIG. 3 operates as follows:

The frequency of the signals received and sent out by duplexer 9 is FR $= F(1 + 2V/c) = F(1 + \alpha)$ where F, as before, is the operating frequency of the voltage-controlled microwave generator 107. After transposition to the intermediate-frequency level by mixer A, the incoming echo signals have a frequency $F_i = FR - F'$ where F' is again the operating frequency of the voltage-controlled microwave generator 207 in the reception-side oscillator, i.e. $F_i = F_o(1 + \alpha)(R_o \pm n_o/N_o) - F_1(R_1 \pm n_1/N_1)$. As the Doppler tracking of the target is carried out in accordance with my invention at transmission-side oscillator 1, the term $F_o(1 + \pm) = F_2$ is a constant. In this case the received intermediate-frequency signal is constant when parameters $R_o$, $R_1$, $N_o$, $N_1$, $n_o$ and $n_1$ satisfy the relationship $$F_2(R_o \pm n_o/N_o) - F_1(R_1 \pm n_1/N_1) = K$$

with $F_2 = F_o(1 + 2V_r/c)$ where $F_o$ again represents the instantaneous operating frequency of the voltage-controlled auxiliary oscillation generator 100 in the transmission-side oscillator 1, $V_r$ is the relative radial velocity of the target with respect to the radar, c is the speed of light in vacuum, $F_1$ is the operating frequency of the master oscillation generator 200 in the reception-side oscillator 2 and K is an arbitrary constant. In this case the frequency of the echo signals received from the target is held at the center of the reception-filter frequency band.

A particularly simple case which enables the above formula to be checked consists in taken the following values for the parameters thereof: $F_2 = F_1$, $N_o = N_1$, $R_o - R_1 = kR$ and $n_o - n_1 = kN$ where kR and kN are two arbitrary constants and $n_o$ and $n_1$ are algebraic numbers. Frequency dividers 101, 105 and 201, 205 may be formed by conventional flip-flops. Frequency multipliers 102 and 202 are formed by semiconductor multiplier stages, for example. The flip-flops forming the frequency dividers need not be described as they are well known in the art. Frequency multipliers have been described in particular in "Radar Handbook" by Merrill Skolnik, published 1970 by McGraw-Hill, Inc., pages 30-3 and 30-4. The frequency-agility controller 13 may be formed by a microprocessor enabling the step-down ratios 1:$n_o$, 1:$N_o$, 1:$n_1$ and 1:$N_1$ of frequency dividers 105, 101 and 205, 201 to be selected in a random sequence. Thus, my present invention enables a frequency-agile Doppler tracking radar to be obtained merely by varying the step-down ratios of two pairs of frequency dividers while keeping incoming echo signals at the i-f level centered in the pass band of the reception filter.

I claim:

1. A transceiver system for a Doppler radar, comprising:

antenna means connected to a duplexer;

a transmission-side oscillator circuit delivering an outgoing microwave signal to said duplexer;

a reception-side oscillator circuit generating a heterodyning signal;

first mixer means connected to said duplexer and to said reception-side oscillator circuit for receiving therefrom an incoming echo signal and said heterodyning signal;

a narrow-band filter connected to an output of said first mixer means for passing an output signal thereof stepped down to an intermediate-frequency level with the aid of said heterodyning signal;

a phase loop including second mixer means connected to outputs of said reception-side and transmission-side oscillator circuits, said phase loop terminating at a video-frequency control input of said transmission-side oscillator circuit;

an automatic-frequency-control loop including a frequency discriminator and a voltage-controlled Doppler oscillator inserted between an output of said narrow-band filter and an input of said second mixer means for introducing into said phase loop a transposition frequency compensating for deviations of the stepped-down output signal of said first mixer means from the central frequency of said narrow-band filter; and a frequency-agility controller emitting a modulating signal to said transmission-side and reception-side oscillator circuits for concurrently varying the frequencies of said outgoing microwave signal and said heterodyning signal without resulting modification of the frequency of said stepped-down output signal.

2. A transceiver system as defined in claim 1 wherein each of said oscillator circuits comprises a microwave generator provided with an internal control loop, a high-frequency generator, a frequency multiplier and a first frequency divider having inputs connected in parallel to said high-frequency generator, a first auxiliary mixer in said internal control loop having inputs connected to said frequency multiplier and to said microwave generator, and a second auxiliary mixer in said internal control loop having one input connected to said first frequency divider and another input connected through a second frequency divider to an output of said first auxiliary mixer, the high-frequency generator of said transmission-side oscillator circuit being connected to said phase loop via said video-frequency control loop, the frequency multipliers of said transmission-side and reception-side oscillator circuits being connected to respective inputs of said second mixer means, said first and second frequency dividers having inputs connected to said frequency-agility controller for varying the step-down ratio thereof in response to said modulating signal.

3. A transceiver system as defined in claim 2 wherein the high-frequency generator of said reception-side oscillator circuit has a fixed operating frequency.

4. A transceiver system as defined in claim 2 or 3 wherein said frequency multipliers have input connected to said frequency-agility controller for varying the step-up ratio thereof in response to said modulating signal.

5. A transceiver system as defined in claim 2 or 3 wherein the first and second frequency dividers of said transmission-side oscillator circuit have step-down ratios respectively equaling those of the first and second frequency dividers of said reception-side oscillator circuit.

6. A transceiver system as defined in claim 2 or 3 wherein said second mixer means comprises a pair of cascaded mixers.

7. A transceiver system as defined in claim 1, 2 or 11 wherein said phase loop includes a video-frequency amplifier inserted between said second mixer means and the control input of said transmission-side oscillator circuit.

* * * * *